(12) United States Patent
Tran et al.

(10) Patent No.: US 8,279,869 B1
(45) Date of Patent: Oct. 2, 2012

(54) RELIABLE COMMUNICATION CHANNEL OVER EXISTING TCP CONNECTION

(75) Inventors: Cuong Huu Tran, Los Altos, CA (US); Veeral P Shah, Maharashtra (IN); Jeffrey J Anuszczyk, Framingham, MA (US); Hans F. van Rietschote, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 562 days.

(21) Appl. No.: 11/731,350

(22) Filed: Mar. 30, 2007

(51) Int. Cl.
*H04L 12/28* (2006.01)
*H04L 12/56* (2006.01)

(52) U.S. Cl. ........ 370/392; 370/389; 370/401; 370/437; 370/466; 709/245

(58) Field of Classification Search .................. None
See application file for complete search history.

(56) References Cited

U.S. PATENT DOCUMENTS

| | | | |
|---|---|---|---|
| 6,219,706 B1 * | 4/2001 | Fan et al. | 709/225 |
| 2001/0047421 A1 * | 11/2001 | Sridhar et al. | 709/230 |
| 2003/0188001 A1 * | 10/2003 | Eisenberg et al. | 709/229 |
| 2004/0004968 A1 * | 1/2004 | Nassar | 370/401 |
| 2005/0091331 A1 * | 4/2005 | Brown et al. | 709/208 |
| 2006/0236370 A1 * | 10/2006 | John et al. | 726/1 |
| 2006/0242322 A1 * | 10/2006 | Williams et al. | 709/245 |

OTHER PUBLICATIONS

Holdrege et al., Network Working Group—RFC: 3027, "Protocol Complications with the IP Network Address Translator," Jan. 2001, pp. 1-20, http://www.ietf.org/rfc/rfc3027.txt.
"2.7.14 Network Address Translators (nat) BOF," IETF Aug. 1997 Proceedings; 5 pages; printed Dec. 26, 2006, http://www3.ietf.org/proceedings/97aug/transit97aug-124.htm.
Bruce Boardman, "Where Did NBC Olympics Turn," Article ID: 169600209; Sep. 1, 2005; 10 pages, printed Dec. 26, 2006, http://www.networkcomputing.com/article/printedFullArticleSrc.jhtml?articleID=169600209.

* cited by examiner

*Primary Examiner* — Jae Y Lee
(74) *Attorney, Agent, or Firm* — Campbell Stephenson LLP

(57) ABSTRACT

Various systems and methods for exchanging communications between devices coupled by an address translation device are disclosed. These techniques can be used to facilitate automatic relationship discovery. One method involves extracting a sequence number from a TCP acknowledgment message being conveyed from a network interface to a TCP stack, and then sending a new TCP message, which includes the sequence number.

17 Claims, 5 Drawing Sheets

RELIABLE COMMUNICATION CHANNEL OVER EXISTING TCP CONNECTION

FIELD OF THE INVENTION

This invention relates to networking and, more particularly, to communication between two modules over an established TCP connection.

DESCRIPTION OF THE RELATED ART

Transmission Control Protocol (TCP) is a communication protocol that is used to convey messages between modules (e.g., applications and/or devices) connected by a network such as the Internet. TCP allows connections to be established between pairs of modules that need to communicate with each other. After a connection has been established, the connected modules use TCP to send messages via the connection. TCP is valued for its ability to provide reliable and in-order message delivery.

Many networks include address translation devices. These address translation devices obscure the true identity of a device by replacing one or more of the addresses included in a message sent to or from that device. For example, the address translation device can replace the source and/or destination TCP address in a TCP message with a new source and/or destination TCP address. At the same time, these address translation devices may be part of a security scheme that prevents connections that do not involve address translation from being established.

In certain situations, the address obfuscation created by the use of an address translation device can create problems for one or both of the modules coupled by a TCP connection. In particular, problems may arise when those modules attempt to discover relationships based upon the TCP communications sent via the connection. For example, it is often desirable for a first module to be able to discover the identity (e.g., a network address) of the module with which the first module is communicating. Such a situation can arise when modules are configured to perform automatic discovery of application relationships. If two modules cannot discover each other's true network address (due to the presence of an address translation device), the automatic discovery process is likely to provide incomplete results.

For example, module A, which has address X, can attempt to discover the identity of module B, which has address Y. Due to the presence of an address translation device within the network that modules A and B use to communicate with each other, however, module A may receive a TCP message from module B that indicates that module B's address is W, and module B may receive a TCP message from module A that indicates that module A's address Z. Accordingly, when automatic discovery is performed, module A will indicate that a dependency exists between module A, which has address X, and module B, which is incorrectly identified as having address W. Module B will likewise indicate that a dependency exists between module B, which has address Y, and module A, which is incorrectly identified as having address Z. If there is no other way for the modules to discover their true addresses, the automatic discovery process will fail to correctly identify the dependency between modules A and B, since the addresses discovered by the respective devices do not match each other (in particular, address Z does not match address X and address W does not match address Y). As this example shows, techniques that allow modules to discover each other's true network addresses are desirable.

While the modules could discover each other's true network addresses by opening up additional TCP connections with which to communicate such information to each other, in many situations, this is impractical and/or infeasible. For example, existing firewalls or other security devices in the network coupling the modules may prevent such connections from being established. Thus, techniques that allow modules to communicate without establishing additional TCP connections are also desirable.

SUMMARY OF THE INVENTION

Various embodiments of systems and methods for exchanging communications between devices coupled by an address translation device are disclosed. These techniques can be used to facilitate automatic relationship discovery.

In one embodiment, a method involves extracting a sequence number from a TCP acknowledgment message being conveyed from a network interface to a TCP stack, and then sending a new TCP message, which includes the sequence number. The method can also involve detecting the establishment of a network connection using Transmission Control Protocol (TCP), wherein the extracting the sequence number is performed subsequent to the detecting.

A special value (e.g., a special TCP option field value, a special signature, and/or a special checksum) can be inserted in the new TCP message. The value can indicate that the new TCP message is being sent to a messaging module.

A non-application payload can also be inserted into the new TCP message. This payload can include a globally unique identifier of a module (e.g., an application and/or computing device from which the new TCP message is being sent) communicating via a TCP connection. The payload can also (or alternatively) include the address of a local application and the address of a second application with which the local application is communicating via a TCP connection. The second address may be a translated address (e.g., as generated by the operation of an address translation device that is processing messages being sent via the TCP connection).

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
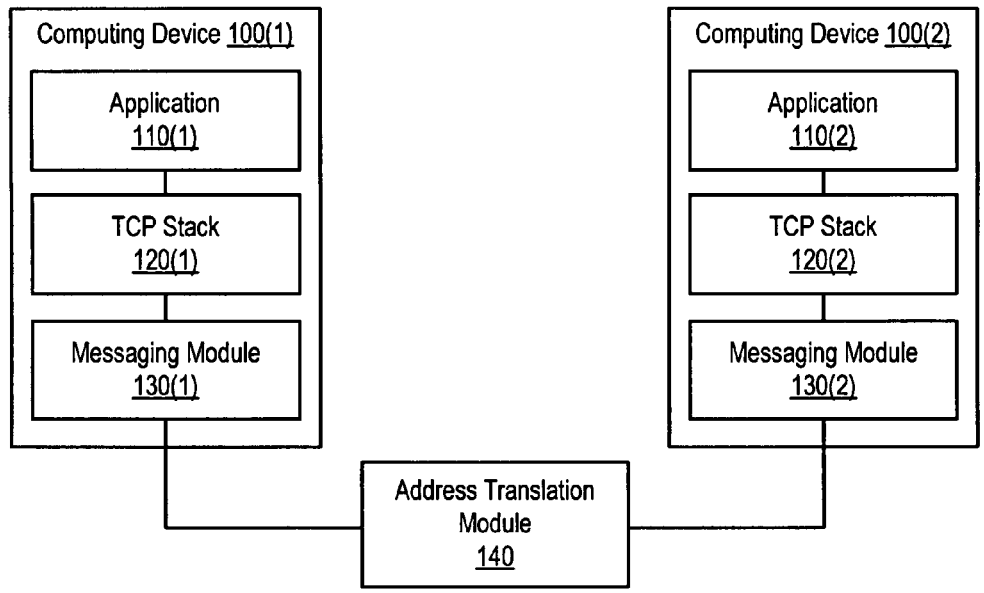
FIG. 1 is a block diagram of a system that includes two computing devices coupled by a network that includes an address translation device, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Computing devices include a messaging module that is configured to exchange messages with a peer messaging module in another computing device over an existing TCP connection. The messaging modules are implemented beneath the TCP stack, such that the messaging modules can process messages being sent to and from the TCP stack via the network, using a pre-existing TCP connection. The messaging modules are configured to record the sequence numbers of acknowledged TCP messages. When the messaging modules exchange communications with each other, one messaging module creates a TCP message containing an already-acknowledged sequence number and a messaging module message. The other messaging module message detects the already-acknowledged sequence number and processes the messaging module message. This form of messaging can be used to exchange device identifiers, such as network addresses, between devices that are coupled by an address translation device. Because the messaging modules can communicate via an already-established TCP connection, the messaging modules are able to communicate despite the presence of the address translation device (which might prevent new connections from being established).

FIG. 1 is a block diagram of a system that includes two computing devices coupled by a network that includes an address translation device. In this example, computing device 100(1) is coupled to computing device 100(2) by a network (not shown) that includes address translation module 140. Computing device 100(1) implements application 110(1), TCP stack 120(1), and messaging module 130(1). Similarly, computing device 100(2) implements application 110(2), TCP stack 120(2), and messaging module 130(2).

Messaging modules 130(1) and 130(2) are configured to implement a reliable communication channel over an established TCP connection in order to exchange messages with each other. The reliable communication channel is effected by using already-acknowledged sequence numbers in each message sent by one of the messaging modules.

Address translation module 140 can be a network address translation (NAT) device and/or a physical address translation (PAT) device. Address translation module 140 can be used as part of a firewall. Alternatively, address translation module 140 can be used to remap a cluster address to a specific device address. As yet another alternative, a separate firewall can be included instead of and/or in addition to address translation module 140.

Security devices such as address translation module 140 often make it impractical (or even impossible) for modules such as messaging modules 130(1) and 130(2) to obtain a dedicated communication path (e.g., a TCP connection) through the security devices. Accordingly, as described in more detail below, messaging modules 130(1) and 130(2) are configured to communicate using an already-established connection.

Address translation module 140 can also be used in situations in which two companies merge and, due to overlapping addresses in the two companies' preexisting address space, some addresses are remapped to avoid collisions. In general, a variety of situations exist in which it is desirable to include an address translation module in a network.

Application 110(1) can communicate with application 110(2) via a TCP connection. TCP stacks 120(1) and 120(2) each implement a version of the TCP protocol. TCP stacks 120(1) and 120(2) are each configured to convey messages using the TCP protocol. In one embodiment, TCP stacks 120(1) and 120(2) are implemented in software and may be part of an operating system installed on computing devices 100(1) and 100(2).

To establish the TCP connection, TCP stack 120(1) initiates a three-way handshake process with TCP stack 120(2). Once a connection is established, TCP stack 120(1) can receive information from application 110(1) and encode that information in TCP messages to be sent to computing device 100(2). Similarly, TCP stack 120(1) can receive TCP messages from computing device 100(2) and provide the information contained within the received TCP messages to application 110(1). TCP stack 120(2) can operate in a similar manner.

TCP uses sequence numbers to track received messages and to handle retransmissions. In particular, each TCP stack inserts a sequence number into each TCP message. Additionally, each TCP stack acknowledges received sequence numbers by inserting the sequence number of the last TCP message received from a peer into each TCP message. By tracking the acknowledgments received from its peer, the TCP stack can determine whether a message needs to be retransmitted (e.g., if that message's sequence number is not included as an acknowledgment but the sequence number of a subsequently-sent message is). If a message having an already-acknowledged sequence number is received (e.g., due to that message being erroneously retransmitted), that message will be dropped by the TCP stack.

When TCP messages are sent from computing device 100(1) to computing device 100(2), address translation module 140 rewrites the source and/or destination address in the TCP messages. Thus, if computing device 100(1) sends a TCP message that has source address A and destination address Y, address translation module 140 may rewrite the TCP message, so that computing device 100(2) receives a TCP message having source address X and destination address Y (as noted above, address translation module 140 could instead rewrite both, instead of just one, of the addresses).

Figure 5:
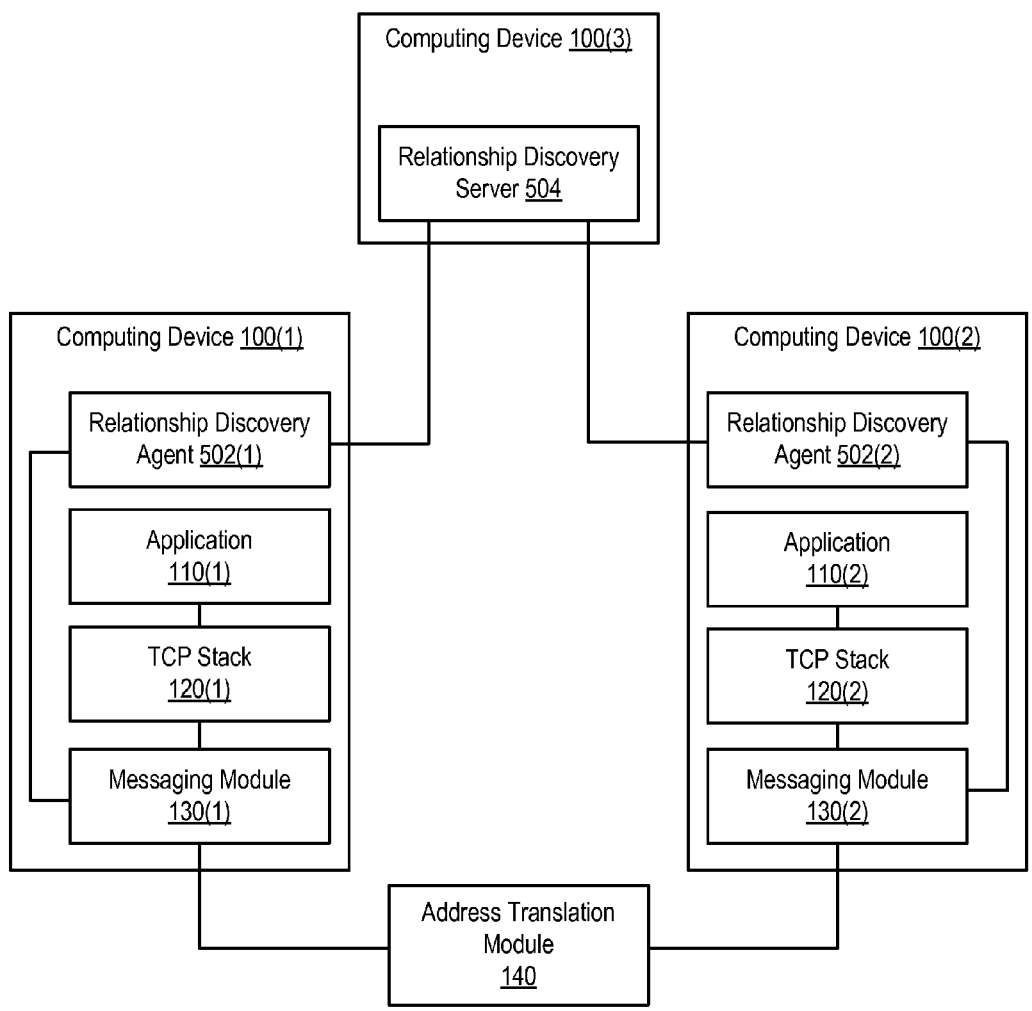
FIG. 5 is a block diagram of system that performs automatic discovery of application relationships using messaging modules, according to one embodiment of the present invention.

As mentioned above, the address translation performed by address translation module 140 can create problems. For example, in a system that performs automatic relationship discovery (e.g., as shown in FIG. 5), a relationship discovery agent on computing device 100(1) will discover that application 110(1) is communicating with application 110(2). Application 110(1) can have true address A and translated address X, and application 110(2) can have true address B and translated address Y. If a relationship discovery agent implemented on computing device 100(1) uses the addresses that those applications use in TCP messages to identify the applications, the relationship discovery agent will indicate that application A depends on application Y. Similarly, if a relationship discovery agent on computing device 100(2) uses the TCP addresses, the relationship discovery agent on computing device 100(2) will indicate that application B depends on application X. If the two relationship discovery agents report these discoveries to a relationship discovery server, the relationship discovery server will not be able to reconcile address A with address X and address B with address Y. Accordingly, the relationship discovery server may not be able to correctly identify the dependency between application 110(1) on computing device 100(1) and application 110(2) on computing device 100(2). This example is just one of many ways in which the use of an address translation device can lead to unintentional problems.

In order to provide a way for computing devices 100(1) and 100(2) (or applications executing on the computing devices) to exchange information, such as the network addresses above, with each other, a messaging module has been implemented on each computing device. In FIG. 1, each messaging module 130(1) and 130(2) is configured to generate one or more messaging module messages that can be sent to a peer messaging module and/or to process any messaging module messages received from a peer. The messaging modules can be configured to exchange messages in a manner that is transparent to upper-level applications and that will not corrupt the TCP stack. In one embodiment, the messaging modules can communicate with each other without the need to perform any special configuration (other than the installation and configuration of the messaging modules themselves) of the applications, computing devices, or intervening network devices.

Messaging modules 130(1) and 130(2) are configured to monitor TCP messages being sent via the connection between application 110(1) and 110(2). By monitoring exchanged TCP messages, messaging modules 130(1) and 130(2) can detect when a TCP connection has been established. Messaging modules 130(1) and 130(2) can also extract sequence numbers and other information (e.g., header information, such as source and destination addresses) from the TCP messages being exchanged via an established TCP connection. For example, in one embodiment, each messaging module tracks (e.g., by storing copies of) the sequence numbers of each TCP message being sent by a higher-level TCP stack (e.g., messaging module 130(1) tracks the sequence numbers of TCP messages sent by TCP stack 120(1), and messaging module 130(2) tracks the sequence numbers of TCP messages sent by TCP stack 120(2)). The messaging modules also track received TCP acknowledgements in order to identify which of the sequence numbers were included in TCP messages that have been acknowledged. Additionally, the messaging modules track the sequence numbers of TCP messages that have been acknowledged by the higher-level TCP stack (e.g., messaging module 130(1) tracks the sequence numbers of TCP messages acknowledged by TCP stack 120(1), and messaging module 130(2) tracks the sequence numbers of TCP messages acknowledged by TCP stack 120(2)).

Messaging modules 130(1) and 130(2) can then use the extracted information (e.g., the TCP sequence numbers) to exchange messaging module messages over the existing TCP connection. In particular, the messaging modules can generate new TCP messages that reuse acknowledged sequence numbers. In particular, a messaging module can generate a new TCP message having the same header (e.g., source and destination addresses) and sequence number as an already-acknowledged TCP message.

Optionally, the messaging module can also set the TCP option in the TCP header to indicate that the TCP packet is a special packet destined for a peer messaging module. The TCP option field takes an integer value. One of the previously-unreserved values of the TCP option field can be reserved for the use of messaging modules.

The messaging module then replaces the application payload of the new TCP message with its own payload. For example, messaging module 130(1) can include a network address that identifies computing device 100(1) and/or application 110(1) in the payload of the new TCP message. In one embodiment, the messaging module's payload includes the TCP source address and/or destination addresses observed in previously-acknowledged TCP header (e.g., this can be used to identify the address that applications on computing device 100(1) "see" as being the address of application 110(2)). The messaging module's payload can also include information such as the universally unique identifier (UUID) of the application and/or computing device from which the new TCP message is being sent.

As another option, the messaging module can include a special value in the payload of the new TCP message in order to allow the peer messaging module to determine that the payload is a messaging module payload. For example, the special value can be a signature, which can include the reused sequence number, that allows the receiving messaging module to ascertain that this is the payload from a peer messaging module, rather than from the application.

The messaging modules can also implement their own protocol or use an existing protocol (e.g., TCP or User Datagram Protocol (UDP)) when creating and processing the messaging module messages. For example, each messaging module message (inserted as the payload of a TCP message created by a messaging module) can include a sequence number or other identifier in order to provide a reliable communication channel over the existing TCP connection. Each time a messaging module successfully receives a messaging module message, the receiving messaging module can send an acknowledgment, which identifies the received messaging module message, to the messaging module that sent the original message. If a particular messaging module message is not acknowledged (e.g., within a particular window or period), the messaging module that originally sent the unacknowledged message can resend the unacknowledged message.

When the new TCP message arrives at the peer messaging module, the peer messaging module will intercept the packet (in fact, all TCP messages are intercepted by the peer messaging module in order to identify acknowledged sequence numbers and the like). The peer messaging module can compare to the sequence number in the new TCP message to a list of acknowledged sequence numbers.

If the sequence number in a received TCP message has not already been acknowledged, the peer messaging module will pass the received TCP message to the TCP stack. The peer messaging module can also track the sequence number in the received TCP message. The peer messaging module will not attempt to process the received TCP message's payload, however.

If the sequence number has already been acknowledged, the peer messaging module can tentatively identify the received TCP message as having been generated by another messaging module. As noted above, the new TCP message can optionally include a special value of the TCP option field and/or a special signature that the peer messaging module can use to definitively identify the new TCP message as having been generated by a peer messaging module.

Once the peer messaging module has identified (either definitively or tentatively) that the new TCP message was generated by a peer messaging module attempt to process the payload of the received TCP message as a messaging module payload. Thus, if the messaging module payload is used to convey addresses or other identifying information, the peer messaging module can attempt to extract address information from the payload of the new TCP message. The peer messaging module can then provide the extracted information to another application or store the extracted information for later use. The processed new TCP message will not be forwarded to the TCP stack (however, if the new TCP message was forwarded to the TCP stack, the TCP stack would simply drop the new TCP message, since it contains an already-acknowledged sequence number).

The messaging modules' exchange of messages is transparent to the applications, TCP stack, and address translation devices. Sequence numbers that have been acknowledged (which are the sequence numbers that each messaging module is tracking) are valid sequence numbers and will therefore be able to pass through any intervening firewall and virus scanning devices. Furthermore, since the sequence numbers have already been acknowledged, any TCP messages sent by the messaging modules will necessarily be dropped (i.e., deleted or otherwise discarded without processing) if received at a TCP stack. Thus, the TCP messages being used by the messaging modules cannot corrupt the TCP stack. For example, if a TCP message generated by a messaging module is delivered to the receiving TCP stack by mistake (e.g., because the peer mapping module on the receiving computing device is not loaded, is malfunctioning, or has not yet been installed), the TCP stack will consider the packet to be a retransmission and drop the packet. Since the TCP message contains messaging module payload (and not application payload), this behavior avoids any corruption.

In this example, messaging modules 130(1) and 130(2) act as pseudo device drivers, in that the messaging modules operate transparently to higher-level software. In some embodiments, messaging modules 130(1) and 130(2) are implemented at a very low level (e.g., beneath the TCP stack), such that the messaging modules are monitoring and generating or processing complete TCP messages that are being conveyed between a network interface card and the TCP stack. In many embodiments, messaging modules 130(1) and 130(2) execute in kernel mode (i.e., a privileged mode, as opposed to the non-privileged mode in which user applications typically execute). However, in other embodiments, messaging modules 130(1) and 130(2) can execute in user mode (e.g., by using a framework such as DTrace to perform kernel-level operations).

Messaging modules 130(1) and 130(2) can be installed as part of a larger suite of applications. For example, the messaging modules can be installed as part of the installation of automatic relationship discovery software. The messaging modules can be configured to access certain configuration information (e.g., an identifier such as a network address assigned to device or application) from a storage location or to request such information from another application. The messaging modules can also be configured to store and/or provide such configuration (e.g., as obtained from a received messaging module message) to another application.

In FIG. 1, computing devices 100(1) and 100(2) are shown as being directly coupled by address translation module 140. It is noted that the actual coupling between computing devices 100(1) and 100(2) is likely to include far more components that have, for the sake of simplicity, been omitted from FIG. 1. For example, address translation module 140 can be part of one or more networks (e.g., a local area network and/or wide area network such as the Internet) that can each be implemented using one or more of a variety of different topologies and media, including electrical, optical, and/or wireless links. Such a network can include various other network devices in addition to address translation module 140, including devices such as routers, switches, bridges, gateways, and the like.

Computing devices 100(1) and 100(2) can be implemented using a variety of different devices, including personal computers, servers, laptop computers, personal digital assistants, cellular phones, network appliances, network devices, and the like. Computing devices 100(1) and 100(2) are devices that can be configured (e.g., in hardware, firmware, and/or software) to implement the functionality of one or more applications, a TCP stack, and/or a messaging module.

Figure 2:
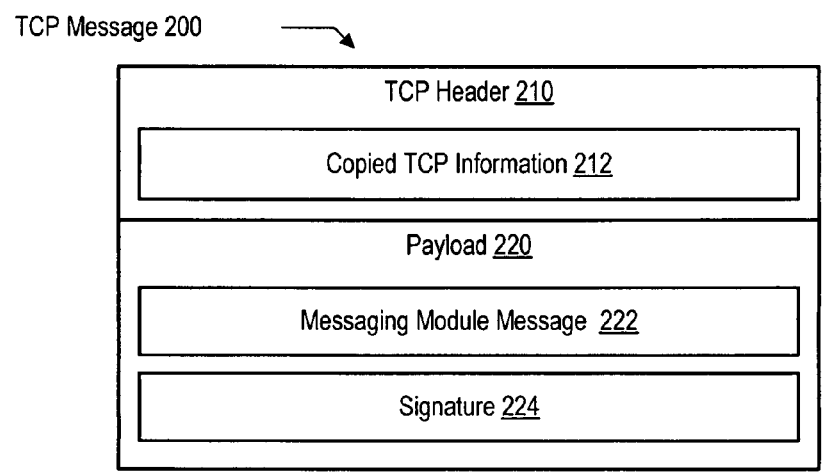
FIG. 2 illustrates a TCP message that can be generated and/or processed by a messaging module, according to one embodiment of the present invention.

FIG. 2 illustrates an example of a TCP message that can be generated and/or processed by a messaging module. As shown, TCP message 200 includes two portions: TCP header 210 and payload 220. TCP header 210 includes copied TCP information 212. As described above, this copied information is obtained from a TCP message that has already been acknowledged. It is noted that copied information (e.g., copied signature information) can also be included in portions of TCP message 200 other than TCP header 210.

Payload 220 is the body of TCP message 200 and includes a messaging module message 222. Unlike a normal TCP message payload, payload 220 does not include application data. Instead, payload 220 includes data created by a messaging module.

Messaging module message 222 is created by a messaging module (e.g., one of messaging modules 130(1) and 130(2) of FIG. 1). Messaging module message 222 can contain information specifically generated by a messaging module that is being communicated to a peer messaging module. For example, messaging module message 222 can include information, such as a network address and/or UUID, that identifies the computing device (and/or an application executing on the computing device) that is sending TCP message 200. Messaging module 222 can also include information, such as a network address, that identifies the application at the other end of the TCP connection (e.g., as obtained from the source address field of a TCP message received from another computing device).

It is noted that, optionally, TCP message 200 can include information that specifically indicates that the TCP message contains a messaging module message. For example, TCP message can include a special value in the TCP option field and/or a special signature 224 in the payload, as described above (it is noted that signature 224 may not be included in alternative embodiments, however). Other values, such as special checksums, could also be used to specifically indicate that the TCP message contains a messaging module message.

Figure 3:
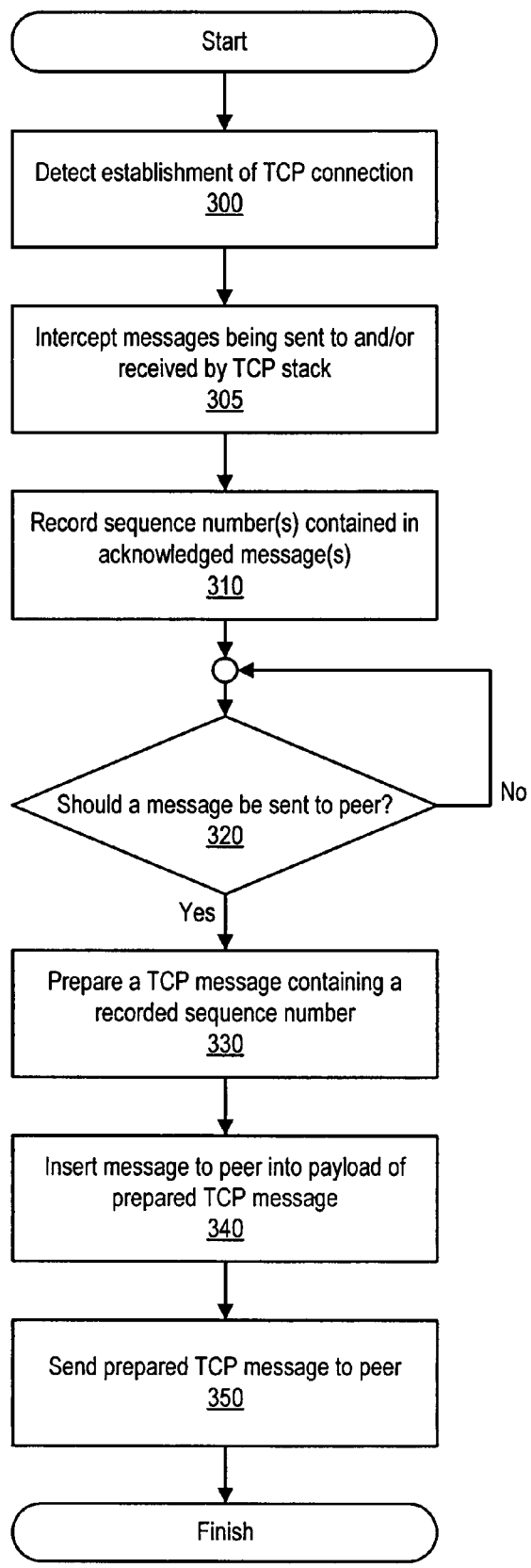
FIG. 3 is a flowchart of a method of sending a TCP message from one messaging module to another, according to one embodiment of the present invention.

FIG. 3 is a flowchart of a method of sending a TCP message from one messaging module to another. This method can be performed by a messaging module like one of messaging modules 130(1) and 130(2) of FIG. 1.

The method begins at 300, when the messaging module detects establishment of a TCP connection. Detecting the establishment of the TCP connection can involve monitoring TCP messages that are being sent to and/or from the TCP stack for one or more messages that indicate establishment of a TCP connection (e.g., by completion of a three-way handshake).

The messaging module then begins intercepting messages being sent to and/or received by the TCP stack, as shown at 305. The messaging module can record (e.g., by storing copies of) sequence numbers that are contained in acknowledged TCP messages, as shown at 310. As new messages are sent or received, the messaging module can record the sequence numbers contained within. As these messages are acknowledged, the messaging module can identify certain ones of the recorded sequence numbers as having been included in acknowledged messages.

If a situation arises in which a messaging module message should be sent to a peer, as shown at 320, the messaging module will reuse one of the acknowledged sequence numbers in a new TCP message. Determination 320 can be based on a variety of predetermined conditions (e.g., depending on the type of information to be exchanged by the messaging modules). For example, if the messaging modules are exchanging addresses, determination 320 can be based upon whether a messaging module message containing the pertinent address information has already been sent, whether such the message has been acknowledged by a peer within a timeout period, whether the address information has changed, and the like.

Sending a messaging module to a peer involves preparing a new TCP message that contains one of the already-acknowledged sequence numbers, as shown at 330. A message to the peer is then inserted into the payload of the new TCP message, as shown at 340. Additional information, such as a special TCP option field value, a special signature, and/or a special checksum, can also be inserted into the new TCP message. The prepared TCP message is then sent to the peer, as shown at 350.

Figure 4:
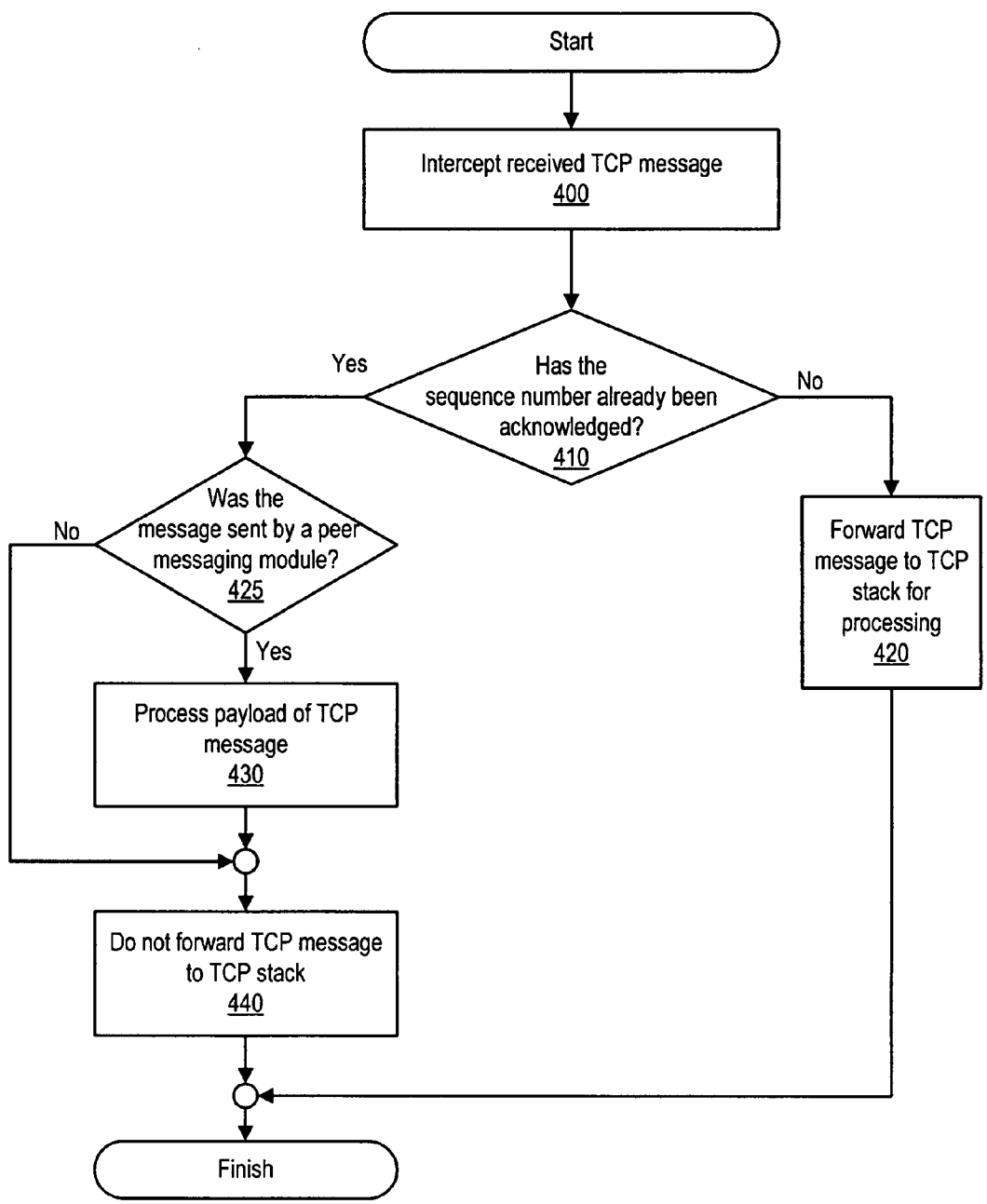
FIG. 4 is a flowchart of a method of receiving a TCP message sent by a messaging module, according to one embodiment of the present invention.

FIG. 4 is a flowchart of a method of receiving a TCP message sent by a messaging module. This method can be performed by a messaging module (e.g., one of messaging modules 130(1) and 130(2) of FIG. 1).

The method begins at 400, when the messaging module intercepts a received TCP message. The messaging module sits between a network interface card and a respective TCP stack, and thus all TCP messages received via the network interface and destined for the TCP stack will be intercepted by the messaging module.

If the intercepted TCP message contains a sequence number that has already been acknowledged, as determined at 410, the messaging module can at least tentatively identify the intercepted TCP message as having been generated by a peer messaging module. It is noted that, in at least some embodiments, additional information (e.g., a special TCP option field value, signature, and/or checksum) within the intercepted message can more definitively identify whether the intercepted TCP message was generated by a peer messaging module, as shown at 425. For example, the messaging module can perform operation 425 by examining the header for a special value of TCP option field that indicates that the message was generated by a peer messaging module. It is noted that operation 425 can be performed prior to and/or at the same time as operation 410 in other embodiments.

Once the intercepted message has been identified as having been generated by a peer messaging module, the messaging module can process the payload of the TCP message as a messaging module message, as shown at 430. Processing the payload of the TCP message can involve extracting information from a messaging module message and storing that information and/or providing that information to another application. After processing, the intercepted TCP message is discarded and is not forwarded to the TCP stack, as indicated at 440.

If the intercepted TCP message contains a sequence number that has not yet been acknowledged, the TCP message is forwarded to the TCP stack for processing, as indicated at 420. The sequence number can also be recorded (not shown).

Alternatively, the messaging module can wait to record the sequence number until the intercepted TCP message is acknowledged.

By using an existing TCP connection in a manner similar to that shown in FIGS. 3 and 4, messaging modules can achieve reliable communication with each other without needing to establish a dedicated TCP connection. Furthermore, by using already acknowledged sequence numbers in the manner described above, the messaging modules can effect their communication without negatively affecting the communication already taking place via the established TCP connection.

It is noted that in some embodiments, certain operations shown in FIGS. 3 and 4 can be performed at the same time (at least in part) and/or in a different order than is shown in the figures. Similarly, other operations can be performed instead of and/or in addition to those shown in the flowcharts. Additionally, certain operations can be omitted in some embodiments.

FIG. 5 is a block diagram of system that performs automatic discovery of application relationships using messaging modules. This system includes many of the same components as FIG. 1. Additions to the system of FIG. 5 include relationship discovery agents 502(1) and 502(2), which are respectively implemented (e.g., in software) on computing devices 100(1) and 100(2), and computing device 100(3), which implements relationship discovery server 504. Computing device 100(3) can be coupled to computing device 100(2) and/or computing device 100(1) by a network (not shown).

Relationship discovery server 504 is configured to record configuration information about the applications executing in the system, as well as the interdependencies between applications. For example, if application 110(1) on computing device 100(1) depends upon application 110(2) (e.g., if application 110(2) is a file system used by application 110(1)), then relationship discovery server 504 can store information identifying each application as well as the dependency between the applications.

Relationship discovery server 504 can also present this information to a user, allowing the user to identify what applications are currently present in the system as well as how those applications are related to each other. The relationship discovery server can present this information in a manner that provides the user with an application-level view of the system (e.g., as opposed to a hardware-level view of the system).

Using the information provided by relationship discovery server 504 allows a user to more effectively manage the system. For example, the user can reduce downtime and/or disruption when performing maintenance tasks or other tasks that may affect the availability of certain applications (e.g., if the user knows that application 110(1) depends on application 110(2), the user knows that shutting computing device 100(2) is likely to disrupt the operation of application 110(1)). In one embodiment, relationship discovery server 504 is implemented as a VERITAS Configuration Manager server (VERITAS Configuration Manager (VCM) software is available from Symantec Corporation of Cupertino, Calif.).

Relationship discovery agent 502(1) is configured to discover what applications are executing on computing device 100(1), as well as any what applications the local applications are communicating with. Relationship discovery agent 502(1) is configured to report the discovered information to relationship discovery server 504. Similarly, relationship discovery agent 502(2) is configured to discover what applications are executing on computing device 100(2), as well as any what applications the local applications are communicating with, and to report the discovered information to relationship discovery server 504.

As shown in FIG. 5, in some embodiments each computing device (e.g., such as computing device 100(1)) in the system can include a similar relationship discovery agent. When multiple relationship discovery agents are present, relationship discovery server 504 can consolidate the configuration information received from multiple different relationship discovery agents.

While the messaging modules are shown as separate modules in FIG. 5, it is noted that messaging modules can alternatively be incorporated into relationship discovery agents. For example, messaging module 130(1) can be incorporated into relationship discovery agent 502(1) and messaging module 130(2) can be incorporated into relationship discovery agent 502(2).

It is noted that in some embodiments, a single relationship discovery agent is present. In such systems, the relationship discovery server 502 can be integrated with the single relationship discovery agent. For example, the functionality to display configuration information to a user (e.g., as provided by relationship discovery server 502) can be incorporated into an individual relationship discovery agent.

In other alternative embodiments, the consolidation of configuration information can be distributed. For example, instead of using a relationship discovery server to consolidate configuration information, each relationship discovery agent can send the configuration information collected by that relationship discovery agent to each of the other relationship discovery agents. Each relationship discovery agent can thus act as relationship discovery server 504.

Relationship discovery agent 502(2) is configured to receive identifying information (e.g., one or more addresses) from messaging module 130(2). For example, messaging module 130(2) can receive a TCP message containing a messaging module message that identifies application 110(1) using address A and application 110(2) using address Y. Messaging module 130(2) can provide this address to relationship discovery agent 502(2), which can then identify address A as the true address of the application with which application 110(2) is communicating, address B as the true address of local application 110(2), and address Y as the translated address of local application 110(2). Messaging module 130(2) can then send information to relationship discovery server 504 indicating that application 110(1), identified by address A, and application 110(2), identified by either address Y or address B, are communicating with each other. Relationship discovery server 504 can then reconcile this information with information received from a relationship discovery agent (if any) on computing device 100(1). If relationship discovery agent 502(1) sends relationship discovery server 504 information indicating that applications 110(1), identified by address A, and 110(2), identified by address Y, are communicating, relationship discovery server 504 can correlate this with the information received from relationship discovery agent 502(1) to determine that applications 110(1) and 110(2) are indeed communicating with each other.

While FIG. 5 shows the messaging modules being used to facilitate relationship discovery, it is noted that other uses of the messaging modules are possible. In general, messaging modules can be used in any situation in which it is desirable to communicate information between two modules over an existing connection.

Figure 6:
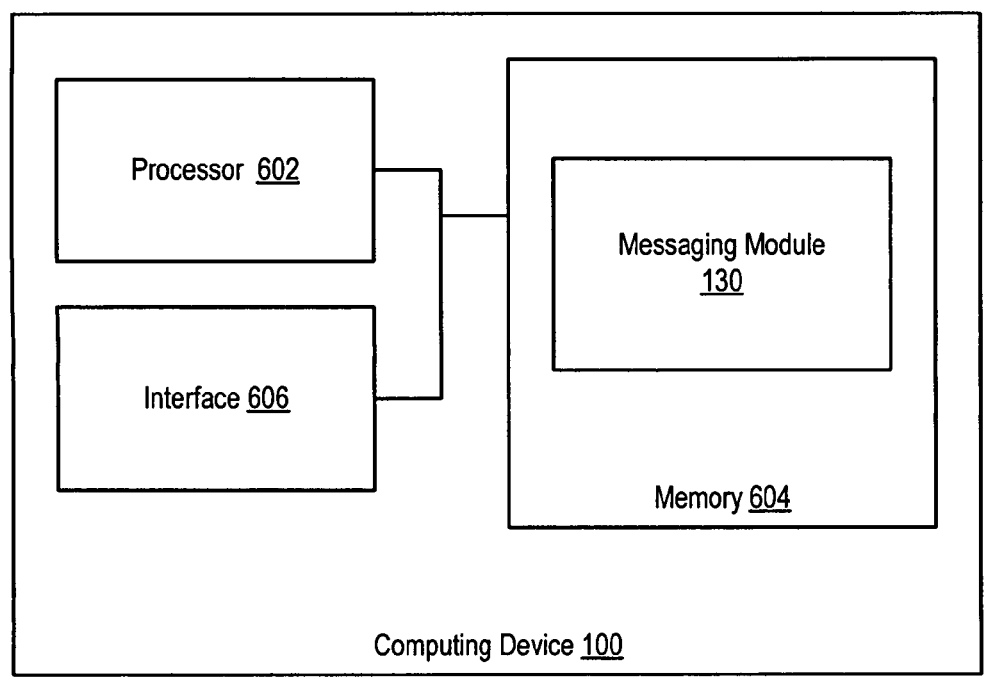
FIG. 6 is a block diagram of a computing device that implements a messaging module, according to one embodiment of the present invention.

FIG. 6 is a block diagram of a computing device 400 that implements a messaging module. FIG. 6 illustrates how certain elements of messaging module 130 (e.g., one of messaging modules 130(1) and 130(2) of FIGS. 1 and 5) can be implemented in software.

Computing device 100 (e.g., one of computing devices 100(1) and 100(2) of FIGS. 1 and 5) can be a personal computer, network appliance, server, personal digital assistant, mobile phone, storage controller (e.g., an array controller, tape drive controller, or hard drive controller), or the like. As illustrated, computing device 100 includes one or more processors 602 (e.g., microprocessors, Programmable Logic Devices (PLDs), or Application Specific Integrated Circuits (ASICs)) configured to execute program instructions stored in memory 604. Memory 604 can include various types of RAM (Random Access Memory), Read Only Memory (ROM), Flash memory, Micro Electro-Mechanical Systems (MEMS) memory, magnetic core memory, and the like. Memory 604 can include both volatile and non-volatile memory. Computing device 100 also includes one or more interfaces 606. Processor 602, interface 606, and memory 604 are coupled to send and receive data and control signals by a bus or other interconnect.

Interface 606 can include a network interface to various networks and/or interfaces to various peripheral buses. For example, interface 606 can include a network interface via which messaging module 130 monitors incoming and/or outgoing TCP messages as well as sends and/or receives modified TCP messages that contain messaging module messages. Interface 606 can also include an interface to one or more storage devices.

In this example, program instructions and data executable to implement all or part of messaging module 130 are stored in memory 604. The program instructions and data implementing messaging module 130 can be stored on various computer readable media that are also storage media such as memory 604. In some embodiments, such software is stored on a computer readable storage medium such as a Compact Disc (CD), Digital Versatile Disc (DVD), hard disk, optical disk, tape device, floppy disk, and the like). In order to be executed by processor 602, the instructions and data can be loaded into memory 604 from the other computer readable storage medium. The instructions and/or data can also be transferred to computing device 100 for storage in memory 604 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    extracting a sequence number from a Transmission Control Protocol (TCP) message, wherein the extracting is performed by a first device, the TCP message is being conveyed from a network interface to a TCP stack, and the sequence number is an acknowledged sequence number indicating a most recently received sequence number that was received by a sender of the TCP message prior to sending the TCP message;
    inserting the copy of the sequence number into a new TCP message, wherein the inserting is performed by the first device;
    sending the new TCP message to a second device, wherein the sending is performed by the first device, a sequence number of the new TCP message comprises the sequence number, the new TCP message comprises information configured to facilitate identifying a dependency between a local application executed by the second device and a second application executed the first device, wherein the identifying is performed by the second device, and the identifying comprises:
  detecting that the second application is identified by a true address of the second application and the local application is identified by a translated address of the local application, and
  transmitting the information to a relationship discovery agent executed by the second device;
sending the information from the relationship discovery agent of the second device to a relationship discovery server indicating that the second application and the local application are communicating with each other; and
determining that the second application and the local application are communicating with each other by correlating the information received from the relationship discovery agent of the second device with another information, that indicates the second application is identified by the true address and the local application is identified by the translated address, wherein the another information is received from a relationship discovery agent of the first device, and wherein the determining is performed by the relationship discovery server.

2. The method of claim 1, further comprising:
detecting establishment of a network connection using TCP, wherein the extracting the sequence number is performed subsequent to the detecting.

3. The method of claim 1, further comprising:
inserting a value in the new TCP message, wherein the value indicates that the new TCP message is being sent to a messaging module.

4. The method of claim 1, further comprising:
inserting a payload in the new TCP message, wherein the payload comprises a globally unique identifier of a module communicating via a TCP connection.

5. The method of claim 4, wherein the module is a computing device from which the new TCP message is being sent.

6. The method of claim 1, further comprising:
inserting a payload in the new TCP message, wherein the payload comprises the translated address of the local application and the true address of the second application, and
the local application is communicating with the second application via a TCP connection.

7. A non-transitory computer readable storage medium comprising program instructions executable to:
  extract a sequence number from a Transmission Control Protocol (TCP) message, wherein a first device is configured to extract the sequence number, the TCP message is being conveyed from a network interface to a TCP stack, and the sequence number is an acknowledged sequence number indicating a most recently received sequence number that was received by a sender of the TCP message prior to sending the TCP message;
  insert the sequence number in a new TCP message, wherein the first device is configured to insert the sequence number; and
  send the new TCP message to a second device, wherein the first device is configured to send the new TCP message, a sequence number of the new TCP message comprises the sequence number, the new TCP message comprises information configured to facilitate identifying a dependency between a local application executed by the second device and a second application executed the first device, wherein, the second device is configured to perform the identifying, and the identifying comprises
  detecting that the second application is identified by a true address of the second application and the local application is identified by a translated address of the local application, and
  transmitting the information to a relationship discovery agent executed by the second device,
  wherein the information is sent from the relationship discovery agent of the second device to a relationship discovery server to indicate that the second application and the local application are communicating with each other, and
  wherein the information received from the relationship discovery agent of the second device is correlated with another information, that indicates the second application is identified by the true address and the local application is identified by the translated address, wherein the another information is received from a relationship discovery agent of the first device to determine that the second application and the local application are communicating with each other, and wherein the correlation is performed by the relationship discovery server.

8. The non-transitory computer readable storage medium of claim 7, wherein the program instructions are executable to:
  detect establishment of a network connection using Transmission Control Protocol (TCP), wherein the sequence number is extracted subsequent to the detecting.

9. The non-transitory computer readable storage medium of claim 7, wherein the program instructions are executable to:
  insert a value in the new TCP message, wherein the value indicates that the new TCP message is being sent to a messaging module.

10. The non-transitory computer readable storage medium of claim 7, wherein the program instructions are executable to:
  insert a payload in the new TCP message, wherein the payload comprises a globally unique identifier of a module communicating via a TCP connection.

11. The non-transitory computer readable storage medium of claim 10, wherein the module is a computing device from which the new TCP message is being sent.

12. The non-transitory computer readable storage medium of claim 7, wherein the program instructions are executable to: insert a payload in the new TCP message, wherein the payload comprises the translated address of the local application and the true address of the second application, and the local application is communicating with the second application via a TCP connection.

13. A system comprising:
a processor; and
a memory coupled to the processor and storing program instructions executable by the processor to:
  extract a sequence number from a Transmission Control Protocol (TCP) message, wherein a first device is configured to extract the sequence number, the TCP message is being conveyed from a network interface to a TCP stack, and the sequence number is an acknowledged sequence number indicating a most recently received sequence number received by a sender of the TCP message prior to sending the TCP message;
  insert the sequence number in a new TCP message, wherein the first device is configured to insert the sequence number; and send the new TCP message to a second device, wherein the first device is configured to send the new TCP message, a sequence number of the new TCP message comprises the sequence number, the new TCP message comprises information configured to facilitate identifying a dependency between a local application executed by the second device and a second application executed the first device, wherein, the second device is configured to perform the identifying, and the identifying comprises detecting that the second application is identified by a true address of the second application and the local application is identified by a translated address of the local application, and transmitting the information to a relationship discovery agent executed by the second device, wherein the information is sent from the relationship discovery agent of the second device to a relationship discovery server to indicate that the second application and the local application are communicating with each other, and wherein the information received from the relationship discovery agent of the second device is correlated with another information, that indicates the second application is identified by the true address and the local application is identified by the translated address, wherein the another information is received from a relationship discovery agent of the first device to determine that the second application and the local application are communicating with each other, and wherein the correlation is performed by the relationship discovery server.

14. The system of claim 13, wherein the program instructions are executable to:

detect establishment of a network connection using Transmission Control Protocol (TCP), wherein the sequence number is extracted subsequent to the detecting.

15. The system of claim 13, wherein the program instructions are executable to:

insert a value in the new TCP message, wherein the value indicates that the new TCP message is being sent to a messaging module.

16. The system of claim 13, wherein the program instructions are executable to:

insert a payload in the new TCP message, wherein the payload comprises the translated address of the local application and the true address of the second application, and the local application is communicating with the second application via a TCP connection.

17. A system comprising:

means for extracting a sequence number from a Transmission Control Protocol (TCP) message, wherein the extracting is performed by a first device, the TCP message is being conveyed from a network interface to a TCP stack, and the sequence number is an acknowledged sequence number indicating a most recently received sequence number received by a sender of the TCP message prior to sending the TCP message;

means for inserting the copy of the sequence number into a new TCP message: wherein the inserting is performed by the first device; and means for sending the new TCP message to a second device, wherein the sending is performed by the first device, a sequence number of the new TCP message comprises the sequence number, the new TCP message comprises information configured to facilitate identifying a dependency between a local application executed by the second device and a second application executed the first device, wherein the identifying is performed by the second device, and the identifying comprises detecting that the second application is identified by a true address of the second application and the local application is identified by a translated address of the local application, and transmitting the information to a relationship discovery agent executed by the second device, wherein the information is sent from the relationship discovery agent of the second device to a relationship discovery server to indicate that the second application and the local application are communicating with each other, and wherein the information received from the relationship discovery agent of the second device is correlated with another information, that indicates the second application is identified by the true address and the local application is identified by the translated address, wherein the another information is received from a relationship discovery agent of the first device to determine that the second application and the local application are communicating with each other, and wherein the correlation is performed by the relationship discovery server.

* * * * *